Feb. 14, 1956 E. M. H. LIPS ET AL 2,734,243
METHOD OF SECURING A METAL SKIN IN A MATRIX BLOCK
Filed Nov. 19, 1952
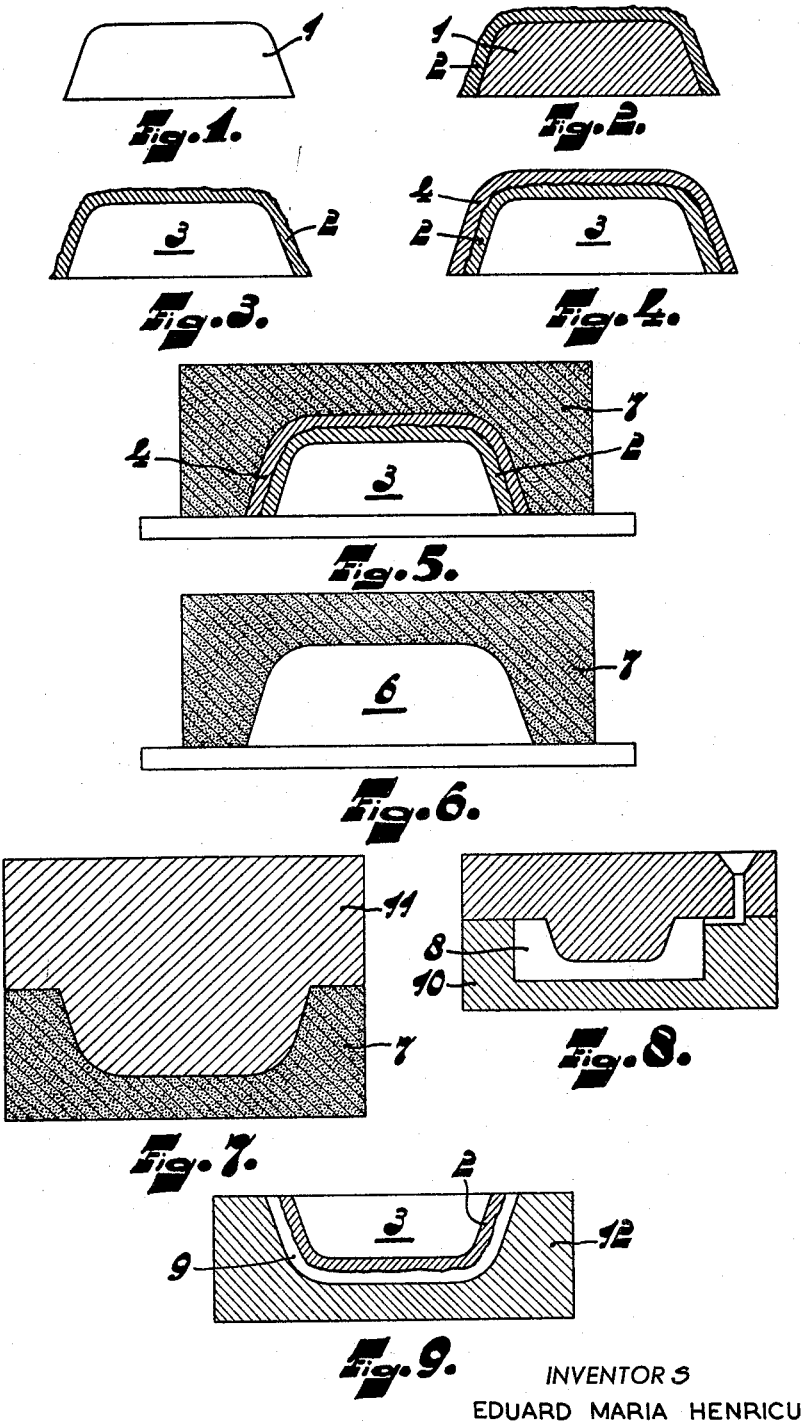
INVENTORS
EDUARD MARIA HENRICUS LIPS
SIES WIEGERSMA
BY
AGENT

United States Patent Office 2,734,243
Patented Feb. 14, 1956

2,734,243

METHOD OF SECURING A METAL SKIN IN A MATRIX BLOCK

Eduard Maria Henricus Lips and Sies Wiegersma, Eindhoven, Netherlands, assignors to Hartford National Bank and Trust Company, Hartford, Conn., as trustee Application November 19, 1952, Serial No. 321,308

Claims priority, application Netherlands December 21, 1951

16 Claims. (Cl. 22—193)

This invention relates to a method of securing a metal skin obtained by a galvano-plastic means or electro-deposition in a matrix block and to a matrix manufactured by such a method.

It is known to manufacture casting or pressing moulds by producing by galvanic means a metal layer on a conductive body suitable for this purpose and subsequently separating the metal layer from the body which has served as a model. For manufacturing an object moulded or extruded in a moulding device or die-casting device with the use of the metal skin thus obtained, it is necessary to secure the metal skin in a matrix block capable of being clamped in the device.

The metal skin secured in a matrix block is subject during the process of moulding or extruding objects to very high pressures, which may reach a value of about 500 kgs. per cm.². The metal skin must not be deformed as a result of the said pressures. Furthermore, it is undesirable that the pressures have the effect of displacing the metal skin in the matrix block.

It has previously been suggested that the irregular back of the metal skin should be coated with a layer of steel applied by the Schoop method. However, applying such a layer by the Schoop method may result in the deformation of the metal skin and the microporus structure of the metal thus applied may cause the metal skin to be displaced in the matrix block under the action of the high pressures. According to a further proposal, the back of the metal skin is provided by galvanic means with a layer of copper, the resultant copper layer then being supplemented, if desired, by steel applied by the Schoop method.

In the method according to the present invention, the metal skin is secured in a matrix block in such a manner that neither the securing in itself, nor the pressure occurring in the moulding or die-casting process results in displacement or deformation of the metal skin.

The invention consists in a method of securing a metal skin manufactured by electro-deposition in a matrix block and it is characterized in that the side of the metal skin remote from the cavity of the object is provided with a layer of material of sufficient thickness, which layer may be removed from the metal. The resultant body constituted by skin and the layer of material is used as a model for manufacturing a mould which, after the model has been removed, has metal poured into it. The cast body subsequently is removed from the mould and a second metal block of this body is manufactured, which block exhibits a cavity having the same dimensions as those of the body constituted by skin and the layer of material, whereupon the said body is deprived of the layer of material and placed in the cavity of the second cast-metal block. Finally, the remaining space is filled with a mass causing the skin and the block to adhere together.

If such is permitted by the shape of the metal skin, it is desirable that the metal skin should be mechanically provided with smooth surfaces before the layer of material is applied, since at the areas of such surfaces the metal skin can directly engage the metal matrix and this is beneficial to the mechanical strength of the assembly.

When the layer of material is applied to the outer side of the metal skin, allowance will be made for any possible contraction of the metal from which the matrix block is cast. Thus, for example as a result of a contraction of 1% occurring during the casting process, a metal skin having a length of 10 cms. and coated with a layer of material of 2 mms. thick, will have an intermediate space of only 1.5 mms. with respect to the block after the latter has been cast. A metal skin having a length of 1 meter is, under such conditions, required to be coated with a layer of material of 7 mms. thick, if after the casting process a space of 2 mms. is to subsist between the cast matrix block and the metal skin.

For satisfactorily carrying out the method according to the invention, it is desirable that the layer of material should be applied to the metal skin in such manner that, when the casting is formed, the object can be removed from the moulding sand and, hence, is detachable. Deep undercuts are, for this purpose, preferably filled with material to be applied so as to obtain a mould which is detachable. As an alternative, such undercuts may be removed, if possible, by mechanical means.

It has been found in practice that suitable metal or cement layers having a certain range of thicknesses of from some tenths of millimeters to some millimeters, even if they consist of comparatively soft material, are not liable to be deformed under the action of the pressures occurring in the moulding process.

The filling material used for filling the remaining space between the metal skin and the metal matrix block may be, for example, metal alloys having a melting point such that any decrease in the strength of the galvanic skin does not occur. Alloys on a base of zinc with about 3% of aluminum, about 3% of copper and at most 1% of magnesium have been found to be suitable of nickel skins. The space between the metal block and the metal skin is preferably filled by heating the block, the skin and the metal alloy together up to the melting point of the alloy.

Cementing material used for the filling may be, for example, "Sorel" cement or porcelain cement on a base of $MgO+MgCl_2$. The substance for coating the galvano-plastic metal skin with a thin layer may be, for example, immersion resin, for example a mixture consisting of 80% of paraffin and 20% of ethylcellulose. Other materials may alternatively be used and they are preferably chosen to be such that a layer ensues which can readily be removed from the metal skin and which does not adhere to the moulding sand to be used.

The layer may be provided in known manner, for example, by extrusion, immersion or casting.

According to the invention, metals suitable for casting the metal block are cast iron or beryllium copper.

A matrix block obtained by the method according to the invention has in cross-section the following particulars. The cavity in which the object to be manufactured is moulded or cast is surrounded by a layer of metal which has a regular and in most cases smooth shape on the side of the cavity and an irregular shape on the side remote therefrom, insofar as the irregular surface has not been removed mechanically. The microstructure of this metal is similar to that obtained with galvanic deposits of metal. Next to this layer there is a layer of metal or cementing material having a certain range of cross-sectional thicknesses. When use is made of the metal, the microstructure thereof is a cast structure. Then follows the metal of the matrix block, of which the surface on the side of the metal skin has a regular shape and the microstructure of which is a cast structure, but may alternatively have a structure similar to that of rolled or forged material.

In order that the invention may be readily carried into effect, it will now be described in greater detail with reference to Figs. 1 to 9 of the accompanying drawing, illustrating the method by which a matrix block according to the invention may be manufactured, said figures showing different phases in the use of this method.

Fig. 1 is a sectional view of a body 1, which is to be manufactured in a pressing mould or casting mould from artificial material or metal. The body 1 may be made in divergent shapes. However, in order to avoid unnecessary complication of the figures with details which are not essential to the method according to the invention, the sectional view 1 of Fig. 1 is that of a simple object, for example a cup.

Fig. 2 is a sectional view of the body 1 comprising a metal skin 2 deposited thereon by galvano-plastic means. The body 1, insofar as it is not conductive, has for this purpose applied to it a conductive surface and is subsequently suspended in a galvanic metal bath in which the layer 2 is produced.

The metal skin on the side of the object accurately follows the surface of the object. On the side remote therefrom, a very irregular surface is always produced, metal accumulations of very peculiar shape occurring more particularly at the areas of projections or cavities in the object.

Fig. 3 shows the metal skin 2 such as it remains after the body 1 has been removed. This removal may take place at any time, provided that it is ensured that the body 1 may readily be detachable, the metal skin applied galvanically being separated from the body in a known manner by a so-called separating layer which prevents the body and the metal skin from adhering together. The metal skin 2 now embraces a cavity 3, in which a product is to be manufactured by moulding or casting, which has a shape similar to that of the body 1.

Fig. 4 shows the model constituted by the metal skin of Fig. 3 having applied to it a layer of material 4. The layer of material may be applied to the metal skin for example by die-pressure casting for metals or injection moulding for plastics. Furthermore, if the material to be applied may be rendered in the liquid state, it is possible to immerse the skin into it. The layer of material thus applied wholly fills up the outer side of the metal skin and, after drying or hardening, the outer side of the layer of material will have a smooth and regular appearance approximately similar to the shape of the cavity 3 embraced by the metal skin.

Fig. 5 shows the manner in which the embodiment shown in Fig. 4 comprising the galvano-plastic metal skin and the surrounding layer of material 4 is placed on a substratum and surrounded by moulding sand 7. The moulding sand 7 is strengthened in a known manner by vibrations and, after sufficient strength is obtained, the model comprising metal skin 2 and layer of material 4 is removed from the moulding sand 7. It may occur that the metal skin 2 on the side remote from the cavity 3 is so irregular in shape that, when the layer of material is applied injudiciously, an object ensues, which is not detachable and, hence, could not be removed from the moulding sand without damage to the mould. Consequently, in applying the layer of material to the metal skin, it is necessary to make allowance for the requirement that a detachable embodiment is obtained. For this purpose any undercuts are required to be filled completely with material. The cavity 6 which exists in the moulding sand 7 in Figure 6, is subsequently filled in a casting box with metal, so that a metal block as indicated by 11 in Fig. 7 is obtained.

The metal block 11 of Fig. 7 is now placed in a casting box in opposed relation to a mould 10, preferably in the form of a box, which is provided with a cavity 8 as shown in Fig. 8. The cavity 8 is then completely filled with metal so as to obtain the cast metal matrix 12 shown in Fig. 9. The metal skin 2 is then removed from the layer of material 4 by pulling-off this layer or dissolving it or removing mechanically, whereupon the skin 2 is placed in the space provided in the cast metal block 12. The outer side of the metal skin formed galvano-plastically and the cast metal block are now separated by a space 9, which is equal to the thickness of the initial layer of material decreased by any contraction of the material occurring in the casting process. This space is filled up with cementing material consisting, for example, of "Sorel" cement or cement on the base of $MgO+MgCl_2$ or, as an alternative, said space may have poured into it a metal mass having a melting point lower than that of the metal skin formed galvano-plastically; for a nickel skin, for example, an alloy on the base of zinc with about 3% of Al, about 3% of Cu and at the most 1% of Mg. Subsequently, the matrix block, together with the metal skin provided therein and the alloy which fills the remaining space may preferably be heated together up to the melting point of the alloy. The resultant matrix block, together with the galvano-plastic metal skin secured therein, is then ready to be secured in the moulding or casting device, it being possible, if necessary, for the outer side to be mechanically processed to the correct size.

While we have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What we claim is:

1. A method of securing a metal skin in a matrix block, comprising the steps of depositing a metal skin on an object by electro-deposition, placing a layer of material of sufficient thickness over the surface of the metal skin remote from the cavity of the object, removing said object, arranging the resultant body comprising said metal skin and layer of material on a substratum and depositing moulding sand thereon to form a sand mould, pouring metal into said sand mould to cast a metal block, removing said metal block from said sand mould, said metal block having a cavity corresponding in size to the body comprising said skin and layer of material, removing said layer of material from said body and placing said body in the cavity of said metal block, and filling the space between said skin and said metal block with a material which joins said skin and said metal block.

2. A method of securing a metal skin in a matrix block as claimed in claim 1 wherein said metal skin is provided with smooth surfaces by mechanical means before said layer of material is applied thereto.

3. A method of securing a metal skin in a matrix block as claimed in claim 1 wherein the thickness of said layer of material is greater than any contraction of material occurring in the casting process.

4. A method of securing a metal skin in a matrix block as claimed in claim 1 wherein said layer of material is applied to said metal skin thereby forming said detachable body.

5. A method of securing a metal skin in a matrix block as claimed in claim 1 wherein said layer of material consists of a mixture of ethyl cellulose and paraffin.

6. A method of securing a metal skin in a matrix block as claimed in claim 1 wherein the space between said skin and said metal block is filled with said second-named material having a melting point lower than that of the metal skin.

7. A method of securing a metal skin in a matrix block as claimed in claim 1 wherein the metal skin is composed of nickel and the metal block of cast iron.

8. A method of securing a metal skin in a matrix block as claimed in claim 1 wherein said metal block, said metal skin, and said second-named material are jointly heated up to the melting point of said alloy.

9. A method of securing a metal skin in a matrix block as claimed in claim 1 wherein said material between said nickel metal skin and cast iron block consists of an alloy of zinc with approximately 4% of aluminum, 3% of copper and 1% of magnesium.

10. A moulding matrix comprising a metal block, a metal skin spaced from said metal block, and a material between said metal skin and metal block causing an adhesion of said metal skin and said metal block.

11. A moulding matrix for moulding an object comprising a metal block, a metal skin spaced from said metal block, a material between said metal skin and metal block causing an adhesion of said metal skin and said metal block, said metal block of said matrix having a cavity with a surface which corresponds substantially to the outer configuration of said object, and said layer of material separating said skin from said metal block.

12. A moulding matrix as claimed in claim 11 wherein said material comprises a metal having a melting point lower than that of the metal skin.

13. A moulding matrix as claimed in claim 11 wherein said material comprises an alloy of zinc with approximately 4% of aluminum, 3% of copper and 1% of magnesium.

14. A method of securing a metal skin in a matrix block as claimed in claim 1 wherein the metal skin is composed of nickel and the metal block of beryllium copper.

15. A method of securing a metal skin in a matrix block as claimed in claim 1 wherein said metal skin is nickel and wherein said space between said nickel metal skin and said metal block is filled with porcelain cement on a base of $MgO + MgCl_2$.

16. A moulding matrix as claimed in claim 11 wherein said material between said metal skin and said metal block comprises cement on a base of $MgO + MgCl_2$.

References Cited in the file of this patent

UNITED STATES PATENTS

| | | |
|---|---|---|
| 412,759 | Keep | Oct. 15, 1889 |
| 1,357,503 | Lucier | Nov. 2, 1920 |
| 1,649,312 | Laukel | Nov. 15, 1927 |
| 1,912,889 | Couse | June 6, 1933 |